United States Patent
Shibata

(10) Patent No.: US 8,376,493 B2
(45) Date of Patent: Feb. 19, 2013

(54) IMAGE FORMING DEVICE AND IMAGE FORMING METHOD

(75) Inventor: Hiroyuki Shibata, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 276 days.

(21) Appl. No.: 12/723,080

(22) Filed: Mar. 12, 2010

(65) Prior Publication Data

US 2010/0245427 A1    Sep. 30, 2010

(30) Foreign Application Priority Data

Mar. 30, 2009  (JP) ................................ 2009-082374

(51) Int. Cl.
*B41J 29/38* (2006.01)

(52) U.S. Cl. ............................................ 347/12; 347/9

(58) Field of Classification Search .................... None
See application file for complete search history.

(56) References Cited

U.S. PATENT DOCUMENTS

| | | | |
|---|---|---|---|
| 6,443,548 B1 * | 9/2002 | Takayama et al. | 347/14 |
| 6,539,863 B2 * | 4/2003 | Shiraishi | 101/365 |
| 7,341,323 B2 * | 3/2008 | Tanaka | 347/15 |
| 7,418,114 B2 * | 8/2008 | Murakami | 382/112 |
| 7,580,168 B2 * | 8/2009 | Ikeno | 358/519 |
| 8,040,556 B2 * | 10/2011 | Takemoto et al. | 358/1.8 |
| 2004/0017415 A1 * | 1/2004 | Nunokawa | 347/15 |
| 2005/0190389 A1 * | 9/2005 | Tanaka | 358/1.9 |
| 2006/0209113 A1 * | 9/2006 | Katsuyama | 347/15 |
| 2008/0291473 A1 | 11/2008 | Takemoto et al. | |
| 2009/0179934 A1 * | 7/2009 | Takagi et al. | 347/15 |
| 2010/0201726 A1 * | 8/2010 | Kondo et al. | 347/10 |

FOREIGN PATENT DOCUMENTS

| | | |
|---|---|---|
| JP | 2000-218823 A | 8/2000 |
| JP | 2003-266666 A | 9/2003 |
| JP | 2007-237477 A | 9/2007 |
| JP | 2009000997 A | 1/2009 |

* cited by examiner

*Primary Examiner* — Stephen Meier
*Assistant Examiner* — Leonard S Liang
(74) *Attorney, Agent, or Firm* — Birch, Stewart, Kolasch & Birch, LLP

(57) ABSTRACT

An image forming device is provided. The image forming device includes: a liquid drop jetting head having liquid chambers including jetting ports that jet liquid drops onto a recording medium, and a flow path that supplies or recovers liquid to or from the respective liquid chambers; and a control component controlling the liquid drop jetting head so that, among a plurality of and at least some of the jetting ports at a same flow path, jetting ports that jet liquid drops so that there becomes a suppressed recording rate that is suppressed as compared with a predetermined standard recording rate in accordance with image information expressing an image to be formed on the recording medium, and jetting ports that jet liquid drops so that there becomes a promoted recording rate that is promoted as compared with the standard recording rate, are neighboring.

10 Claims, 12 Drawing Sheets

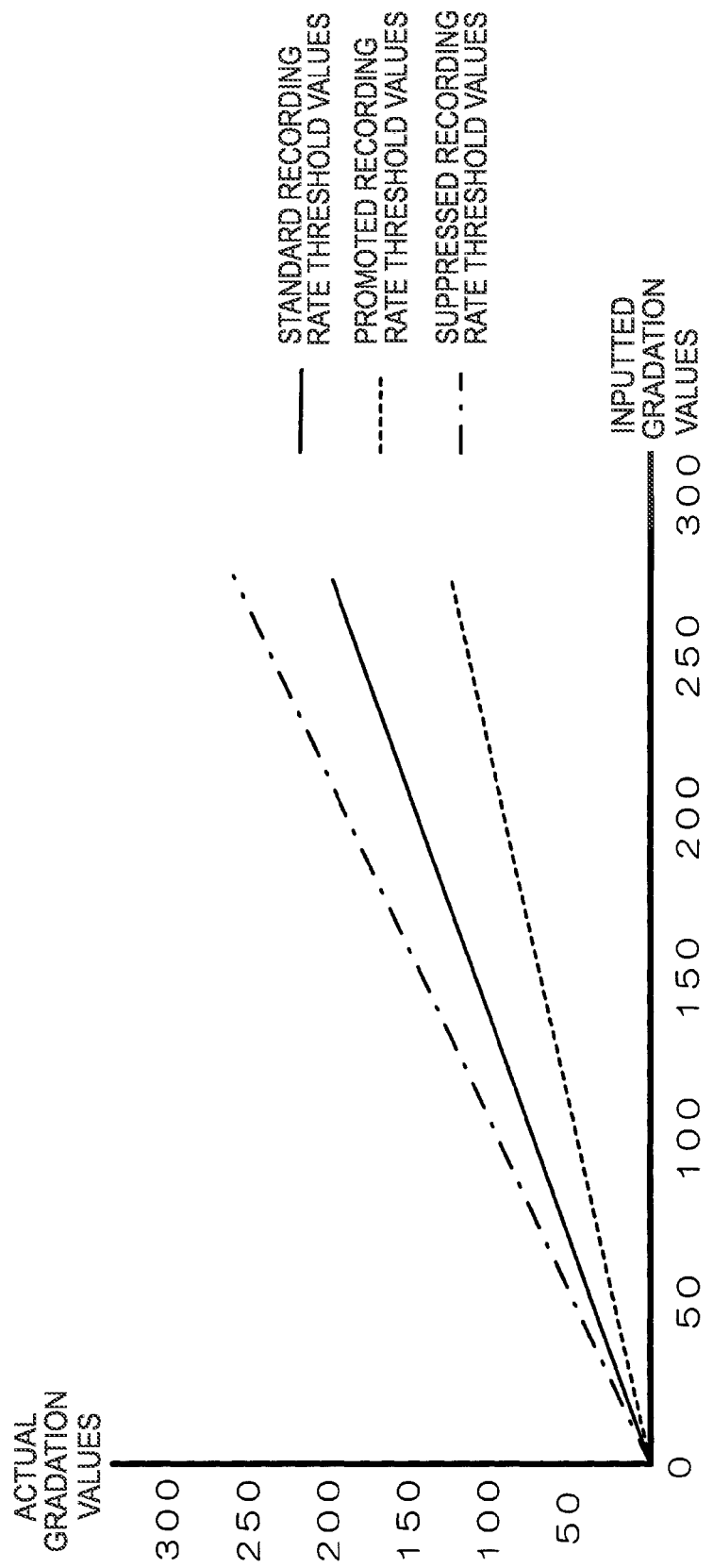

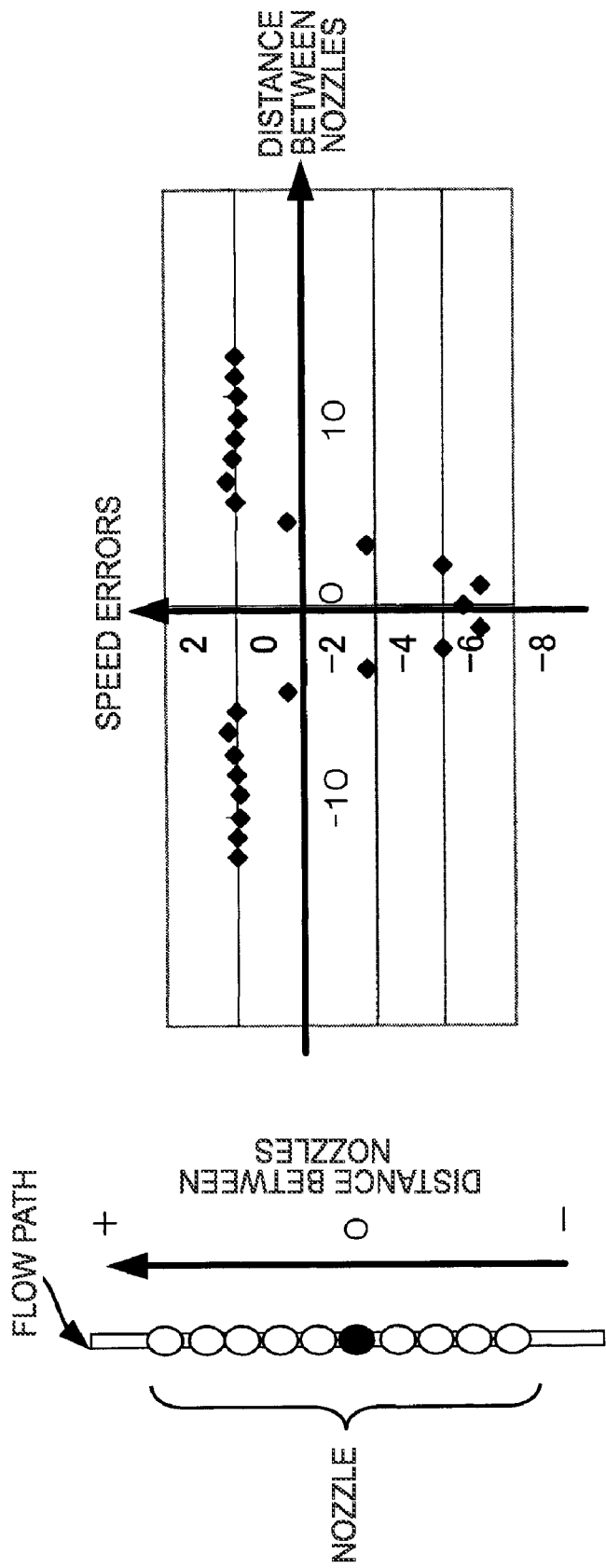

IMAGE FORMING DEVICE AND IMAGE FORMING METHOD

CROSS-REFERENCE TO RELATED APPLICATION

This application claims priority under 35 USC 119 from Japanese Patent Application No. 2009-082374 filed on Mar. 30, 2009, the disclosure of which is incorporated by reference herein.

BACKGROUND OF THE INVENTION

1. Field of the Invention

The present invention relates to an image forming device and an image forming method, and in particular, to an image forming device that supplies liquid drops to plural liquid chambers from one flow path, and to an image forming method using the image forming device.

2. Description of the Related Art

In an inkjet printer that jets ink drops by raising the pressures of ink chambers, the jetted ink amounts and the jetting speeds changing due to the presence/absence of simultaneous jetting of nearby nozzles (hereinafter called "crosstalk") is known. These are caused by the meniscus force that arises accompanying the reduction of the ink amount of the ink chamber, or by pressure waves that accompany jetting. An example of changes in jetting speed is shown in FIG. 12. One flow path, and plural nozzles that jet ink drops due to ink being supplied from the flow path are illustrated in FIG. 12. By using the black nozzle as a reference, it is shown that, the closer the distance between the nozzles, the greater then speed errors as is shown in FIG. 12.

In recent years, due to the demands on inkjet printers for increased speed, decreased electric power consumption and increased quality, attention has focused in single-pass inkjet printers using a line head at which nozzles are arrayed two-dimensionally. However, it is easy for such inkjet printers to be affected by crosstalk. At high density portions in particular, crosstalk manifests forms on the image as unevenness of density, stripe-like unevenness and jaggedness, and is a cause of deterioration in image quality.

Japanese Patent Applications Laid-Open (JP-A) Nos. 2000-218823 and 2007-237477 are proposed as techniques for suppressing unevenness of density due to crosstalk. JP-A No. 2000-218823 discloses an unevenness correcting method with respect to unevenness of density caused at the time when numerous ink drops are jetted simultaneously, i.e., with respect to the above-described problem. Among the jetting errors, with regard to errors in the drop amounts, JP-A No. 2000-218823 discloses a method of improving image quality by applying feedback to changes in the volume of an ink path.

On the other hand, JP-A No. 2007-237477 discloses a method of correcting unevenness of density that arises due to a reduction in drop amounts caused at the time when ink drops are jetted frequently from the same nozzle mainly in terms of time. In accordance with JP-A No. 2007-237477, back-pressure fluctuations are predicted from prepared print data, density fluctuations are predicted from the predicted back-pressure, and the print data is corrected on the basis of these fluctuations.

Further, there is the idea to suppress simultaneous jetting of adjacent nozzles, and JP-A No. 2003-266666 discloses a technique of suppressing simultaneous jetting of adjacent nozzles within a scan by using a mask pattern in a serial printer.

However, as disclosed in JP-A No. 2000-218823, incorporating this mechanism is related to a great increase in manufacturing costs. Further, because controlling drop amounts is generally difficult, there is the problem that unevenness of density cannot be completely eradicated.

Moreover, with the method disclosed in JP-A No. 2007-237477, even with the print data after correction, meniscus fluctuations are bound to arise, and, in order to predict the unevenness of density, prediction must be carried out again which is difficult in practice. Further, neither of JP-A Nos. 2000-218823 and 2007-237477 can address jaggedness and the like that arise due to fluctuations in speed. Also, the technique disclosed in JP-A No. 2003-266666 cannot be applied to single-pass printers.

Thus, the conventional art have the drawbacks that they cannot easily suppress image deterioration including at least one of unevenness of density, stripe-like unevenness, and jaggedness caused by crosstalk.

SUMMARY OF THE INVENTION

In view of the above-described problems, an object of the present invention is to provide an image forming device that suppresses the occurrence of crosstalk.

An aspect of the present invention is an image forming device. The image forming device comprises: a conveying component that conveys a recording medium; a liquid drop jetting head having liquid chambers including jetting ports that jet liquid drops onto the recording medium conveyed by the conveying component, and a flow path that supplies or recovers liquid to or from the respective liquid chambers; and a control component controlling the liquid drop jetting head so that, among a plurality of and at least some of the jetting ports at a same flow path, jetting ports that jet liquid drops so that there becomes a suppressed recording rate that is suppressed as compared with a predetermined standard recording rate in accordance with image information expressing an image to be formed on the recording medium, and jetting ports that jet liquid drops so that there becomes a promoted recording rate that is promoted as compared with the standard recording rate, are neighboring.

BRIEF DESCRIPTION OF THE DRAWINGS

FIG. 11 is a drawing showing threshold values in an error diffusion method; and FIG. 12 is a drawing showing speed errors.

DETAILED DESCRIPTION OF THE INVENTION

An exemplary embodiment of the present invention will be described in detail hereinafter with reference to the drawings. Note that, here, description is given of a case in which the present invention is applied to a so-called inkjet printer (hereinafter called "image forming device") that forms images by ink drops. Further, the formation of an image is called printing upon occasion.

First, the overall structure of an image forming device 10 relating to the present exemplary embodiment will be described.

[Image Forming Device]

Figure 1:
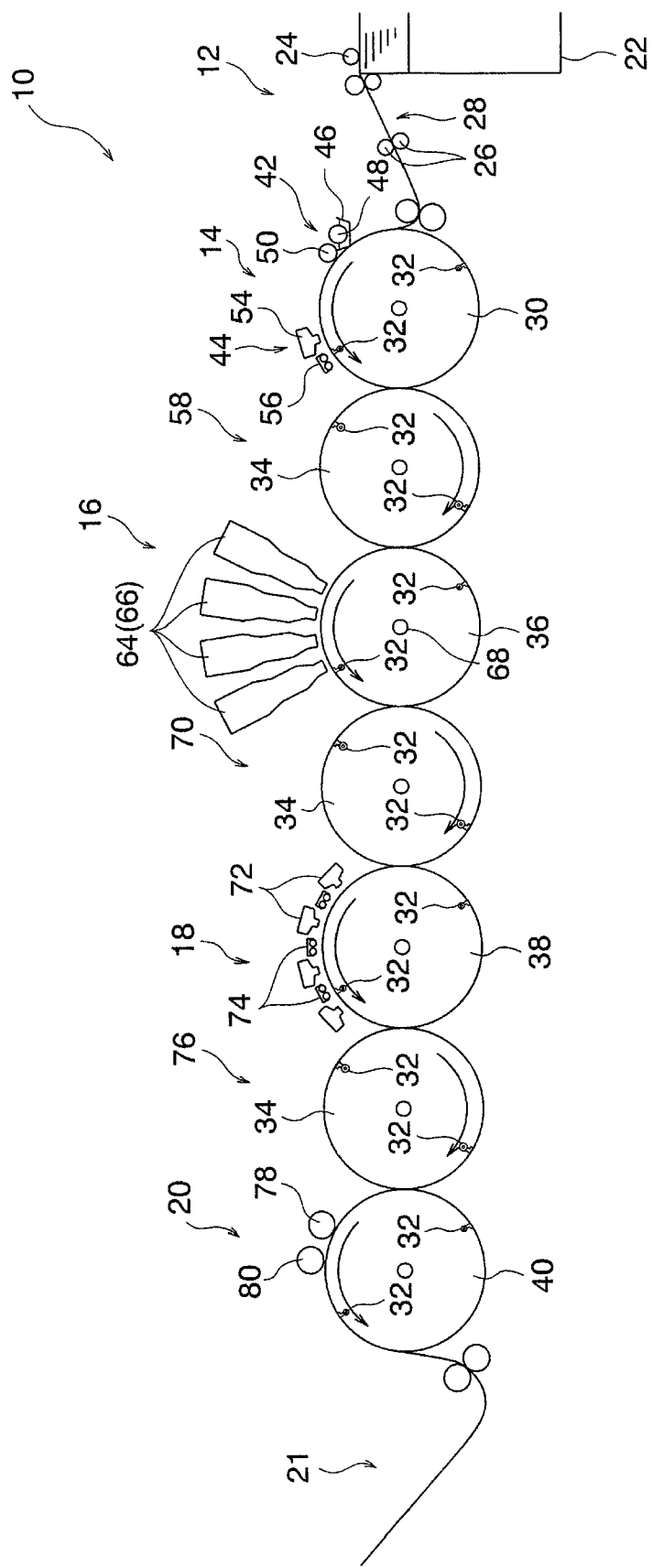
FIG. 1 is a sectional side view showing the structure of an image forming device relating to an exemplary embodiment of the present invention.

As shown in FIG. 1, a sheet feeding/conveying section 12 that feeds and conveys sheets is provided at the image forming device 10 relating to the present exemplary embodiment, at the conveying direction upstream side of sheets serving as recording media. A processing liquid applying section 14 that applies processing liquid to the recording surface (image forming surface) of a sheet, an image forming section 16 that forms an image on the recording surface of the sheet, an ink drying section 18 that dries the image formed on the recording surface, an image fixing section 20 that fixes the dried image to the sheet, and a discharging section 21 that discharges-out the sheet on which the image has been fixed, are provided at the downstream side of the sheet feeding/conveying section 12 along the sheet conveying direction.

The respective processing sections will be described hereinafter.

(Sheet Feeding/Conveying Section)

The sheet feeding/conveying section 12 has a stacking section 22 in which sheets are stacked. A sheet feeding section 24 that feeds-out, one-by-one, the sheets that are stacked in the stacking section 22 is provided at the conveying direction downstream side of the sheets of the stacking section 22 (hereinafter simply called "sheet conveying direction" upon occasion). The sheet that is fed by the sheet feeding section 24 passes through a conveying section 28 structured by plural roller 26 pairs, and is conveyed to the processing liquid applying section 14.

(Processing Liquid Applying Section)

A processing liquid applying drum 30 is disposed so as to be rotatable at the processing liquid applying section 14. Holding members 32, that nip the leading end portion of a sheet and hold the sheet, are provided at the processing liquid applying drum 30. In a state in which a sheet is held at the surface of the processing liquid applying drum 30 via the holding member 32, the sheet is conveyed toward the downstream side by the rotation of the processing liquid applying drum 30.

Note that, in the same way as at the processing liquid applying drum 30, holding members 32 are also provided at intermediate conveying drums 34, an image forming drum 36, an ink drying drum 38 and a fixing drum 40 that will be described later. Further, the transferring of a sheet from an upstream side drum to a downstream side drum is carried out by the holding members 32.

A processing liquid applying device 42 and a processing liquid drying device 44 are disposed above the processing liquid applying drum 30, along the peripheral direction of the processing liquid applying drum 30. A processing liquid is applied onto the recording surface of the sheet by the processing liquid applying device 42, and the processing liquid is dried by the processing liquid drying device 44.

The processing liquid reacts with ink, aggregates the color material (pigment), and has the effect of promoting separation of the color material (pigment) and the solvent. A storing portion 46, in which the processing liquid is stored, is provided at the processing liquid applying device 42, and a portion of a gravure roller 48 is soaked in the processing liquid.

A rubber roller 50 is disposed so as to press-contact the gravure roller 48. The rubber roller 50 contacts the recording surface (obverse) side of the sheet and applies the processing liquid thereto. Further, a squeegee contacts the gravure roller 48 so as to control the processing liquid application amount that is applied to the recording surface of the sheet.

It is ideal that the film thickness of the processing liquid is sufficiently smaller than the liquid drop jetted by the head. For example, in a case in which the jetted drop amount is 2 pl, the average diameter of the liquid drop jetted by the head is 15.6 μm. If the film thickness of the processing liquid is thick, the ink dot floats within the processing liquid without contacting the recording surface of the sheet. It is preferable to make the film thickness of the processing liquid be less than or equal to 3 μm in order to obtain a landed dot diameter of greater than or equal to 30 μm at an jetted drop amount of 2 pl.

On the other hand, a hot air nozzle 54 and an infrared ray heater 56 (hereinafter called "IR heater 56") are disposed at the processing liquid drying device 44 so as to be near to the surface of the processing liquid applying drum 30. Due to the hot air nozzle 54 and the IR heater 56, the solvent such as water or the like within the processing liquid is evaporated, and a solid or thin-film processing liquid layer is formed on the recording surface side of the sheet. By making the processing liquid be a thin layer in the processing liquid drying process, the dots formed by the jetting of ink at the image forming section 16 contact the sheet surface such that the needed dot diameter is obtained, and further, it is easy to obtain the effects of reacting with the processing liquid that has been made into a thin film, and aggregating the color material, and fixing on the sheet surface.

The sheet, on whose recording surface the processing liquid has been applied and dried in this way at the processing liquid applying section 14, is conveyed to an intermediate conveying section 58 that is provided between the processing liquid applying section 14 and the image forming section 16.

(Intermediate Conveying Section)

The intermediate conveying drum 34 is provided so as to be rotatable at the intermediate conveying section 58. The sheet is held on the surface of the intermediate conveying drum 34 via the holding member 32 provided at the intermediate conveying drum 34, and is conveyed downstream by the rotation of the intermediate conveying drum 34.

(Image Forming Section)

The image forming drum 36 that corresponds to a conveying component is provided so as to be rotatable at the image forming section 16. The sheet is held on the surface of the image forming drum 36 via the holding member 32 provided at the image forming drum 36, and is conveyed downstream by the rotation of the image forming drum 36.

Head units 66 having single-pass inkjet line heads 64 (hereinafter called "heads 64") at which nozzles (jetting ports) that jet ink drops onto the sheet conveyed by the conveying component are provided in a two-dimensional form, are disposed above the image forming drum 36 so as to be near to the surface of the image forming drum 36. At the head units 66, the heads 64 of at least Y (yellow), M (magenta), C (cyan), K (black) that are reference colors are arrayed along the peripheral direction of the image forming drum 36, and form images of the respective colors on the processing liquid layer that was formed on the recording surface of the sheet at the processing liquid applying section 14.

The processing liquid has the effect of making the color material (pigment) and the latex particles that are dispersed within the ink aggregate in the processing liquid, and forms aggregates at which flowing of the color material and the like do not arise on the sheet. As an example of the reaction between the ink and the processing liquid, by using a mechanism in which pigment dispersion is destroyed and aggregates are formed by including an acid within the processing liquid and lowering the pH, running of the color material, color mixing between the inks of the respective colors, and jetted drop interference due to uniting of liquids at the time when the ink drops land are avoided.

The heads 64 carry out jetting of drops synchronously with an encoder that is disposed at the image forming drum 36 and detects the rotating speed. Due thereto, the landing positions of the drops are determined highly accurately, and patches of jetted drops can be reduced independently of deviation of the image forming drum 36, the precision of a rotating shaft 68, or the surface speed of the drum.

Note that the head units 66 can be withdrawn from the upper portion of the image forming drum 36. Maintenance operations such as cleaning of the nozzle surfaces of the heads 64, expelling of ink whose viscosity has increased, and the like are carried out by withdrawing the head units 66 from the upper portion of the image forming drum 36.

Due to the rotation of the image forming drum 36, the sheet, on whose recording surface an image is formed, is conveyed to an intermediate conveying section 70 that is provided between the image forming section 16 and the ink drying section 18. Because the structure of the intermediate conveying section 70 is substantially the same as that of the intermediate conveying section 58, description thereof is omitted.

(Ink Drying Section)

The ink drying drum 38 is provided so as to be rotatable at the ink drying section 18. Plural hot air nozzles 72 and IR heaters 74 are disposed at the upper portion of the ink drying drum 38 so as to be near to the surface of the ink drying drum 38. Due to the warm air from the hot air nozzles 72 and the IR heaters 74, at the portion of the sheet where the image is formed, the solvent that was separated by the color material aggregating action is dried, and a thin-film image layer is formed.

The warm air is usually set to 50° C. to 70° C., although it differs in accordance with the conveying speed of the sheet as well. The evaporated solvent is discharged to the exterior of the image forming device 10 together with air, but the air is recovered. This air may be cooled by a cooler/radiator or the like and recovered as liquid.

Due to the rotation of the ink drying drum 38, the sheet, on whose recording surface the image is dried, is conveyed to an intermediate conveying section 76 that is provided between the ink drying section 18 and the image fixing section 20. Because the structure of the intermediate conveying section 76 is substantially the same as that of the intermediate conveying section 58, description thereof is omitted.

(Image Fixing Section)

The image fixing drum 40 is provided so as to be rotatable at the image fixing section 20. At the image fixing section 20, the latex particles within the thin-layer image layer that was formed on the ink drying drum 38 are heated/pressurized and fused, and the image fixing section 20 has the function of fixing them on the sheet.

A heating roller 78 is disposed at the upper portion of the image fixing drum 40 so as to be near to the surface of the image fixing drum 40. At the heating roller 78, a halogen lamp is built-in within a metal pipe of aluminum or the like that has good thermal conductivity, and thermal energy of greater than or equal to the Tg temperature of the latex is provided by the heating roller 78. Due thereto, the latex particles fuse and push-in fixing into the indentations and protrusions on the sheet is carried out, and the unevenness of the surface of the image can be leveled and glossiness can be obtained.

A fixing roller 80 is provided at the downstream side of the heating roller 78. The fixing roller 80 is disposed in a state of press-contacting the surface of the image fixing drum 40, and nipping force is obtained between the fixing roller 80 and the image fixing drum 40. Therefore, at least one of the fixing roller 80 and the image fixing drum 40 has an elastic layer at the surface thereof, and there is a uniform nip width with respect to the sheet.

The sheet, on whose recording surface an image is fixed by the above-described processes, is conveyed by the rotation of the image fixing drum 40 toward the discharging section 21 side that is provided at the downstream side of the image fixing section 20.

Note that, although the image fixing section 20 is described in the present exemplary embodiment, it suffices to be able to, at the ink drying section 18, dry and fix the image that is formed on the recording surface. Therefore, the image fixing section 20 is not absolutely necessary.

The system structure of the image forming device 10 relating to the present exemplary embodiment will be described next with reference to FIG. 2.

Figure 2:
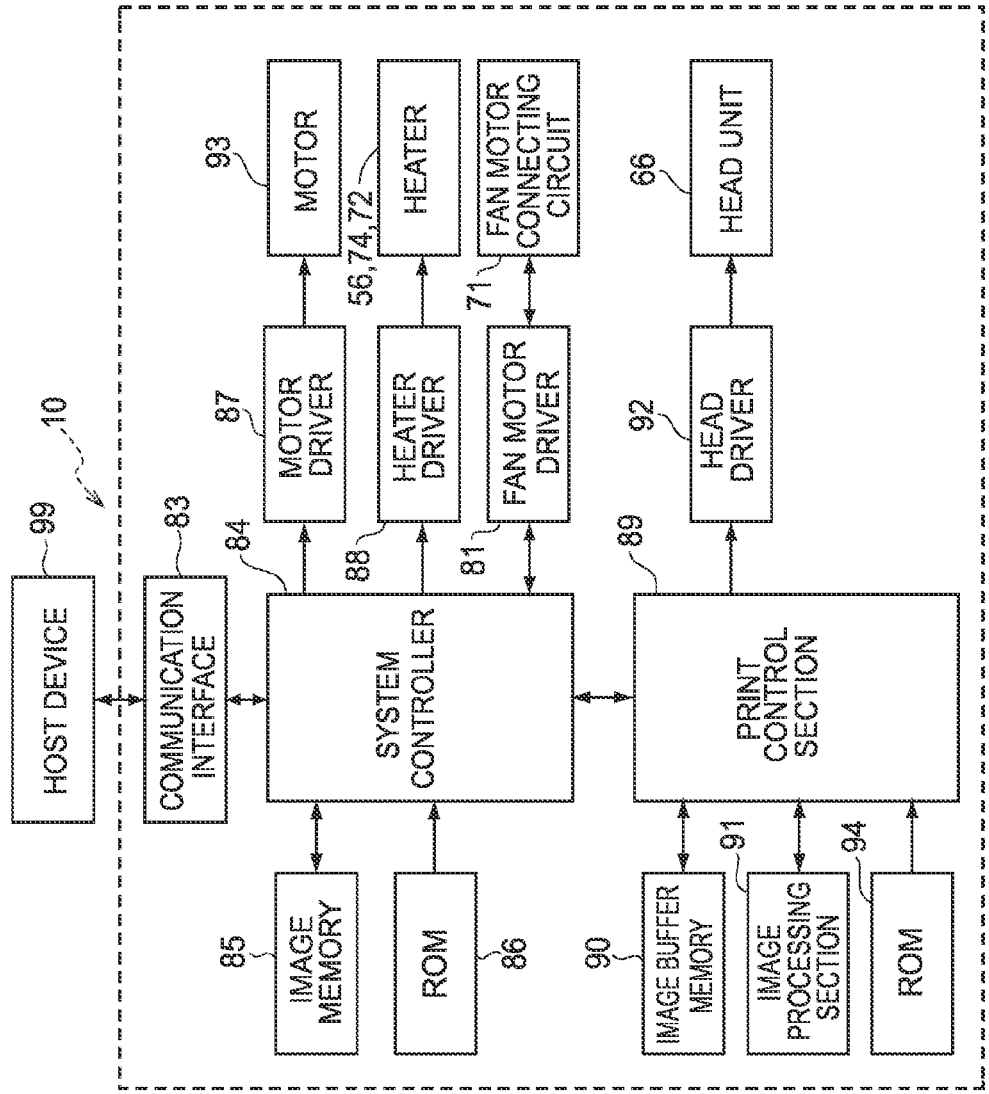
FIG. 2 is a block diagram showing the system structure of the image forming device relating to the exemplary embodiment of the present invention.

As shown in FIG. 2, the image forming device 10 has a communication interface 83, a system controller 84, an image memory 85, a ROM 86, a motor driver 87, a heater driver 88, a fan motor driver 81, a print control section 89, an image buffer memory 90, an image processing section 91, a head driver 92, and the like.

The communication interface 83 is an interface section with a host device 99 that a user uses for carrying out instruction of image formation and the like with respect to the image forming device 10. A serial interface such as a USB (Universal Serial Bus), IEEE 1394, an ETHERNET®, a wireless network and the like, or a parallel interface such as centronics or the like, can be used as the communication interface 83. A buffer memory for increasing the speed of communication may be installed in this portion.

Image information sent-out from the host device 99 is fetched by the image forming device 10 via the communication interface 83, and is once stored in the image memory 85. The image memory 85 is a storage component that stores image information that has been inputted via the communication interface 83, and reading and writing of information from and to the image memory 85 are carried out via the system controller 84. The image memory 85 is not limited to a memory formed from a semiconductor element, and a magnetic medium such as a hard disk or the like may be used.

The system controller 84 is structured by a central processing unit (CPU), peripheral circuits thereof, and the like. The system controller 84 functions as a control device that controls the overall image forming device 10 in accordance with predetermined programs, and functions as a computing device that carries out various types of computation. Namely, the system controller 84 controls respective sections such as the communication interface 83, the image memory 85, the motor driver 87, the heater driver 88, the fan motor driver 81, and the like, and carries out control of communication with the host device 99, control of reading and writing from and to the image memory 85 and the ROM 86, and the like, and generates control signals that control motors 93 of the sheet conveying system and the IR heaters 56, 74, 72. Note that, in addition to control signals, the system controller 84 also transmits image information that is stored in the image memory 85 to the print control section 89.

Programs that the CPU of the system controller 84 executes, various types of data that are needed for control, and the like are stored in the ROM 86. The ROM 86 may be a non-rewritable storage component. However, if the various types of data are updated as needed, a rewritable storage component such as an EEPROM is preferably used as the ROM 86.

The image memory 85 is used as a temporary storage region of image information, and is also used as a program expansion region and as a computing work region of the CPU.

The motor driver 87 is a driver (driving circuit) that drives the motors 93 of the sheet conveying system in accordance with instructions from the system controller 84. The heater driver 88 is a driver that drives the IR heaters 56, 74, 72 in accordance with instructions from the system controller 84.

The fan motor driver 81 is a driver that drives respective fan motors 73 and a fan motor connecting circuit 71 in accordance with instructions from the system controller 84.

On the other hand, the print control section 89 is structured from a CPU, peripheral circuits thereof, and the like. In accordance with control of the system controller 84, the print control section 89 carries out, in cooperation with the image processing section 91, processings such as various types of manipulations, corrections and the like for generating signals for jetting control from the image information within the image memory 85, and supplies generated ink jetting data to the head driver 92 so as to control the jetting driving of the head units 66.

A ROM 94, in which are stored programs that the CPU of the print control section 89 executes and various types of data needed for control and the like, is connected to the print control section 89. The ROM 94 also may be a non-rewritable storage component. However, if the various types of data are updated as needed, a rewritable storage component such as an EEPROM is preferably used as the ROM 94.

The image processing section 91 generates dot placement data per ink color from the inputted image information, and carries out halftone processing (intermediate gradation processing) on inputted image information, and determines high-quality dot positions.

Note that, in FIG. 2, the image processing section 91 is illustrated as being a structure separate from the system controller 84 and the print control section 89. However, for example, the image processing section 91 may be included in the system controller 84 or the print control section 89 and may structure a portion thereof.

Further, the print control section 89 has an ink jetting data generating function that generates jetting data of the ink (control signals of the actuators corresponding to the nozzles of the heads 64) on the basis of the dot placement data generated at the image processing section 91, and has a driving waveform generating function.

The ink jetting data generated by the ink jetting data generating function is provided to the head driver 92, and the ink jetting operations of the head units 66 are controlled.

The driving waveform generating function is a function that generates driving signal waveforms for driving the actuators corresponding to the respective nozzles of the heads 64.

The signals (driving waveforms) that are generated by the driving waveform generating function are supplied to the head driver 92. Note that the signals that are generated by the driving waveform generating function may be digital waveform data, or may be analog voltage signals.

The image buffer memory 90 is provided at the print control section 89. Data such as image information, parameters and the like at the time of image information processing at the print control section 89 are temporarily stored in the image buffer memory 90. Note that FIG. 2 illustrates a form in which the image buffer memory 90 is appended to the print control section 89, but the image buffer memory 90 may also serve as the image memory 85.

Note that a form in which the print control section 89 and the system controller 84 are consolidated and structured by a single processor is also possible.

Figure 3:
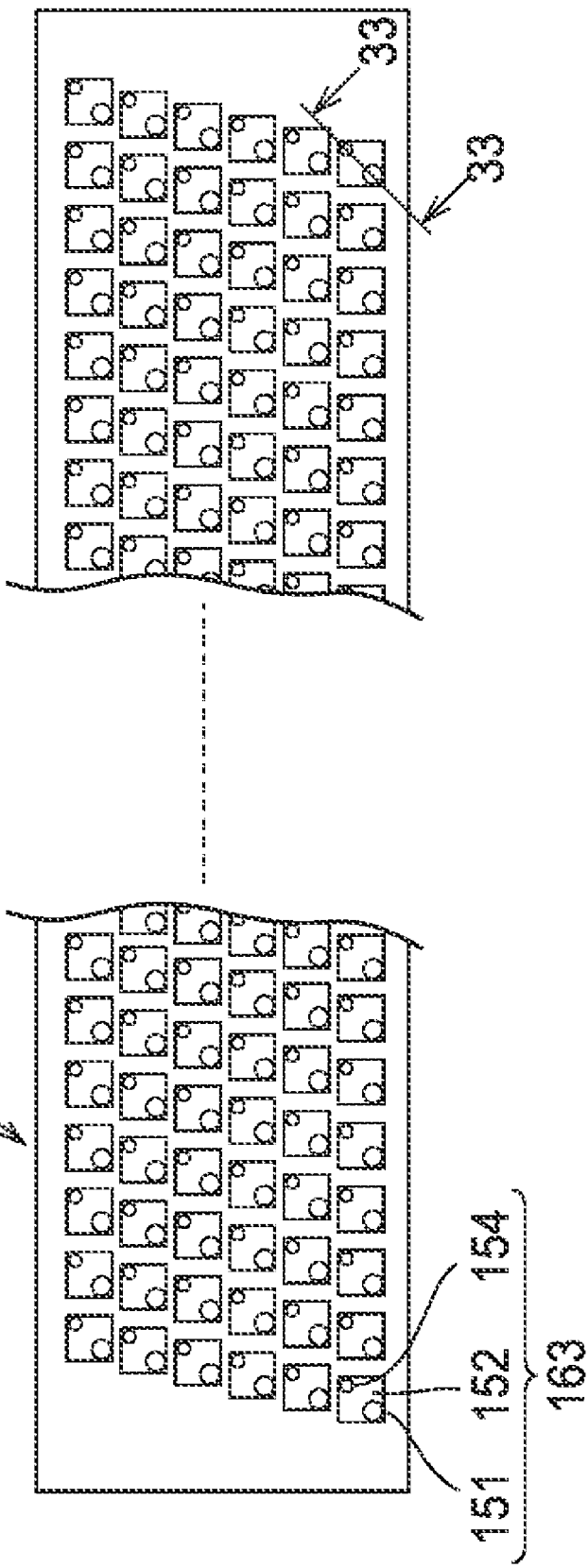
FIG. 3 is a plan view showing a structural example of a head relating to the exemplary embodiment of the present invention.
Figure 4:
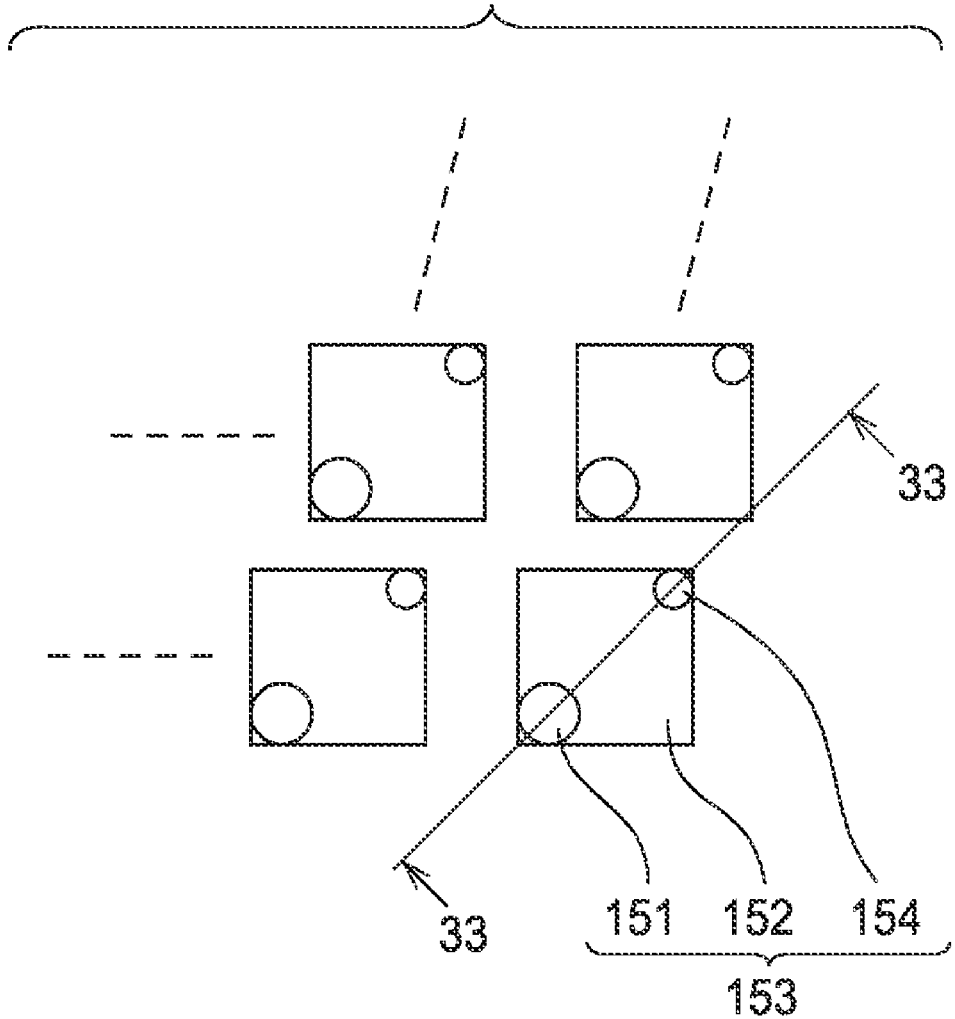
FIG. 4 is an enlarged view of the structural example of the head relating to the exemplary embodiment of the present invention.
Figure 5:
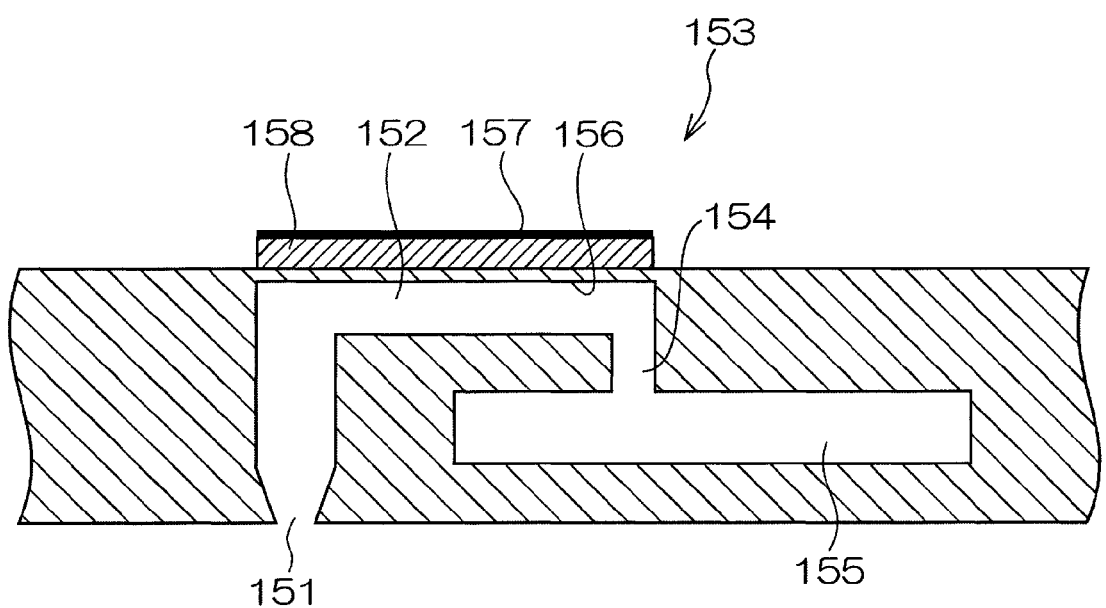
FIG. 5 is a sectional view showing the solid structure of a liquid drop jetting element relating to the exemplary embodiment of the present invention.

FIG. 3 is a plan view showing a structural example of the head 64, and FIG. 4 is an enlarged view of a portion thereof. Further, FIG. 5 is a sectional view (a sectional view along line 33-33 of FIG. 4) showing the solid structure of one liquid drop jetting element (an ink chamber (liquid chamber) unit corresponding to one nozzle 151).

In order to make the dot pitch that is printed on a recording sheet 116 be high-density, the nozzle pitch at the head 64 must be made to be high-density. As shown in FIG. 3 and FIG. 4, the head 64 of the present example has a structure in which plural ink chamber units (liquid drop jetting elements) 153, that are formed from the nozzles 151, pressure chambers 152 corresponding to the respective nozzles 151, and the like, are disposed so as to be staggered and in the form of a matrix (two-dimensionally). Due thereto, a high density of the substantial nozzle interval (projected nozzle pitch) that is projected so as to be lined-up along the head longitudinal direction (a direction orthogonal to the sheet feeding direction) is achieved.

Note that a form, in which one or more nozzle rows are structured along a length corresponding to the entire width of the recording sheet 116 in a direction intersecting the feeding direction of the recording sheet 116, is not limited by the present example.

The shapes, in plan view, of the pressure chambers 152 that are provided so as to correspond to the respective nozzles 151 are substantially square (see FIG. 3 and FIG. 4). A flow-out port to the nozzle 151 is provided at one of the both corner portions on a diagonal line of the pressure chamber 152, and a flow-in port (supply port) 154 of the supplied ink is provided at the other. Note that the shape of the pressure chambers 152 is not limited to that of the present example, and the shape in plan view may be any of various forms such as quadrangular (rhomboid, rectangular, or the like), pentagonal, hexagonal, another polygonal shape, circular, oval or the like.

As shown in FIG. 5, the respective pressure chambers 152 communicate with a common flow path 155 via the supply ports 154. The common flow path 155 communicates with an ink tank that is the ink supply source. Ink supplied from the ink tank is distributed and supplied to the respective pressure chambers 152 via the common flow path 155.

An actuator 158 having an individual electrode 157 is joined to a pressure-applying plate (a vibrating plate that also serves as a common electrode) 156 that structures the surface of a portion of the pressure chamber 152 (the ceiling surface in FIG. 5). By applying driving voltage between the individual electrode 157 and the common electrode, the actuator 158 deforms, the volume of the pressure chamber 152 changes, and, due to the change in pressure accompanying this, ink is jetted from the nozzle 151. Note that a piezoelectric element using a piezoelectric body such as lead zirconate titanate, barium titanate, or the like is suitably used as the actuator 158. After the jetting of the ink, when the displacement of the actuator 158 returns to the original state, new ink is replenished to the pressure chamber 152 through the supply port 154 from the common flow path 155.

Ink drops can be jetted from the nozzles 151 by controlling the driving of the actuators 158 corresponding to the respective nozzles 151 in accordance with the dot placement data generated from the image information. A desired image can be recorded on the recording sheet 116 by controlling the ink jetting timings of the respective nozzles 151 in accordance with the conveying speed while conveying the recording sheet 116 that is the recording medium in the conveying direction at a constant speed, as explained in FIG. 1.

Figure 6:
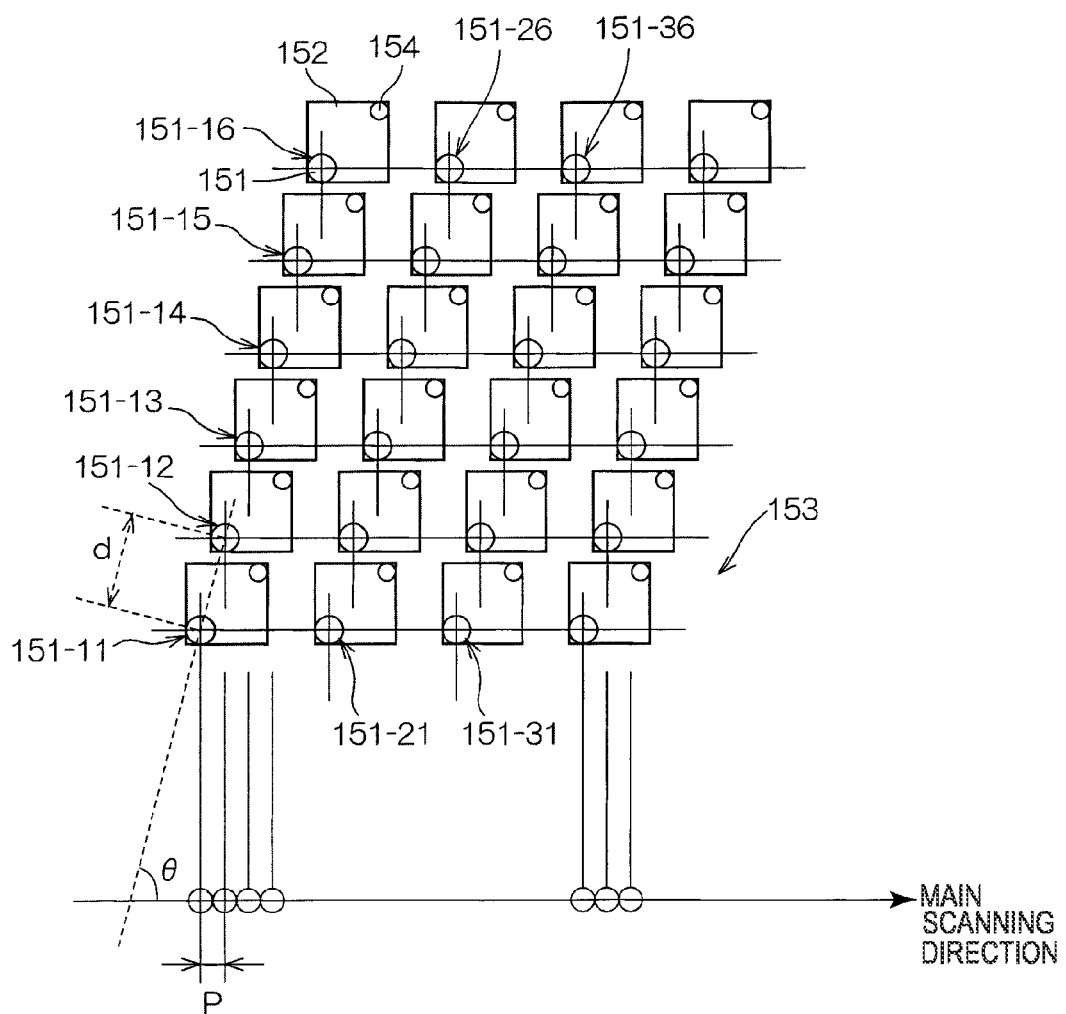
FIG. 6 is a schematic drawing showing an example of a nozzle array of the head relating to the exemplary embodiment of the present invention.

The high-density nozzle head of the present example is realized by arraying a large number of the ink chamber units 153, that have the above-described structure, in the form of a grid in a uniform array pattern along the line direction, that runs along an intersecting direction that intersects the conveying direction as shown in FIG. 6, and an oblique column direction that is not orthogonal to and has a uniform angle θ with respect to the intersecting direction.

Namely, in accordance with a structure in which the plural ink chamber units 153 are arrayed at a uniform pitch d along the direction of a given angle θ with respect to the main scanning direction, a pitch P of the nozzles projected so as to be lined-up in the main scanning direction is d×cos θ, and, in the main scanning direction, the array can be handled equivalently to a structure in which the respective nozzles 151 are arrayed rectilinearly at the uniform pitch P. In accordance with this structure, a high-density nozzle structure in which a nozzle row, that is projected so as to be lined-up in the main scanning direction, reaches 2400 per inch (2400 nozzles/inch) can be realized.

The arranged structure of the nozzles when implementing the present invention is not limited to that of the illustrated example. Further, in the present exemplary embodiment, a method is employed of jetting the ink drops by deformation of the actuators 158 that are exemplified by piezo elements (piezoelectric elements). However, when implementing the present invention, the method of jetting ink is not particularly limited. Instead of a piezo jetting method, any of various types of methods can be applied such as a thermal jetting method in which the ink is heated by a heat-generating body such as a heater or the like such that air bubbles are generated, and ink drops are jetted due to the pressure thereof, or the like.

Hereinafter, explanation will be given of controlling the head 64 such that, among the plural nozzles 151 of at least a portion of the same flow path, the nozzles 151, that jet ink drops such that there becomes a suppressed recording rate that is suppressed as compared with a standard recording rate that is determined in advance in accordance with image information expressing the image to be printed on the sheet, and the nozzles 151, that jet ink drops such that there becomes a promoted recording rate that is promoted as compared with the standard recording rate, are neighboring. Note that, in the following description, the nozzles, that jet ink drops such that there becomes the suppressed recording rate that is suppressed as compared with the standard recording rate, are called suppressed nozzles, and the nozzles, that jet ink drops such that there becomes the promoted recording rate that is promoted as compared with the standard recording rate, are called promoted nozzles.

The recording rate is the occupied proportion of the surface area printed by ink drops jetted from the nozzles. The standard recording rate expresses the recording rate that is applied in cases in which the present exemplary embodiment is not applied. This standard recording rate is determined in advance per individual image forming device in accordance with the operating environment and the like of the image forming device. The suppressed recording rate is a recording rate that suppresses the recording rate as compared with the standard recording rate, and the promoted recording rate is a recording rate that promotes the recording rate as compared with the standard recording rate.

When the recording rate is suppressed, ink drops being jetted from the nozzles is reduced. When the recording rate is promoted, ink drops being jetted from the nozzles is increased. Given that the probability of an ink drop being jetted from a suppressed nozzle is p, and the probability of an ink drop being jetted from a promoted nozzle is q, the probability of being jetted simultaneously is pq. In order to maintain the density constant, it is desirable that p+q is constant. However, under this condition, the probability pq of being jetted simultaneously becomes a maximum when p=q. Therefore, if the jetting ratio of suppressed/promoted nozzles is set to q>p, and nozzles that are neighboring within a same flow path are set as suppressed/promoted nozzles, the probability of nozzles that are neighboring within a same flow path simultaneously jetting becomes small. Thus, as shown in FIG. 12, the distance between nozzles that jet simultaneously in a same flow path becomes long, and therefore, occurrence of crosstalk can be suppressed.

Figure 7A:
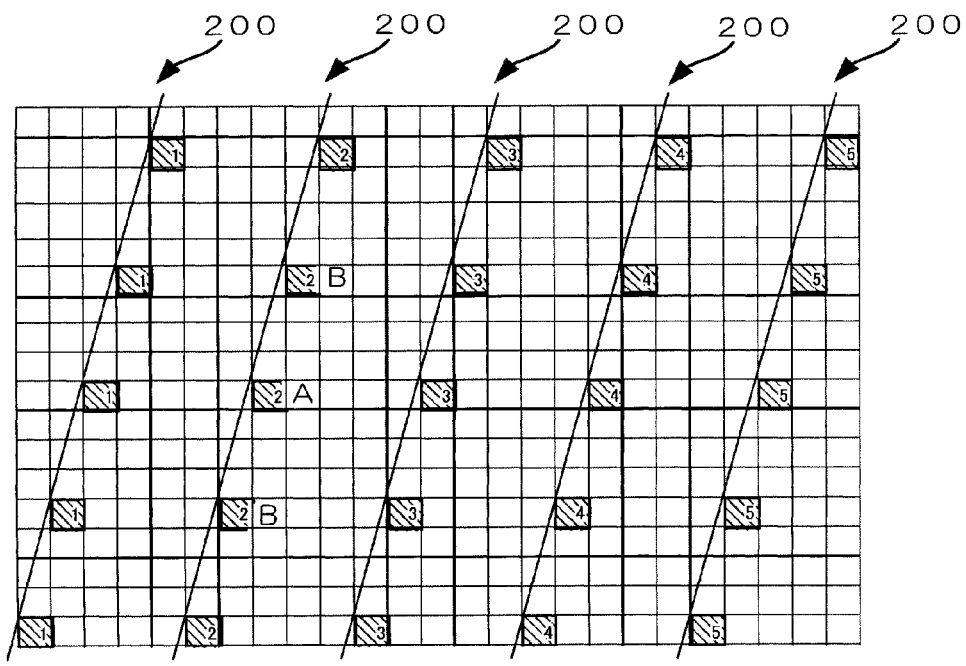
FIG. 7A and FIG. 7B are drawings showing an example of flow paths, and an arrangement of the flow paths and the nozzles.

Next, an example of the arrangement of suppressed nozzles and promoted nozzles will be described by using FIG. 7A and FIG. 7B in which an example of the arrangement of flow paths and nozzles is illustrated. FIG. 7A shows a nozzle arrangement example, and FIG. 7B shows the arrangement focusing in particular on one flow path.

Five flow paths 200 that are illustrated by straight lines, and plural nozzles that are illustrated by rectangles, are shown in FIG. 7A. At each of the flow paths 200, there are disposed five nozzles to which ink is supplied from the flow path contacting them in the drawings. The flow paths are numbered starting from the left. Further, in the nozzle arrangement shown in these drawings, nozzles to which ink is supplied from the same flow path exist at positions, with respect to one another, that are offset by one toward the right and offset by four in the vertical direction, or at positions opposite thereto. Note that the nozzle arrangement does not depend on the above-described example. In the above-described example, the nozzles are arrayed two-dimensionally, but the nozzles may be arrayed one-dimensionally.

Figure 7B:
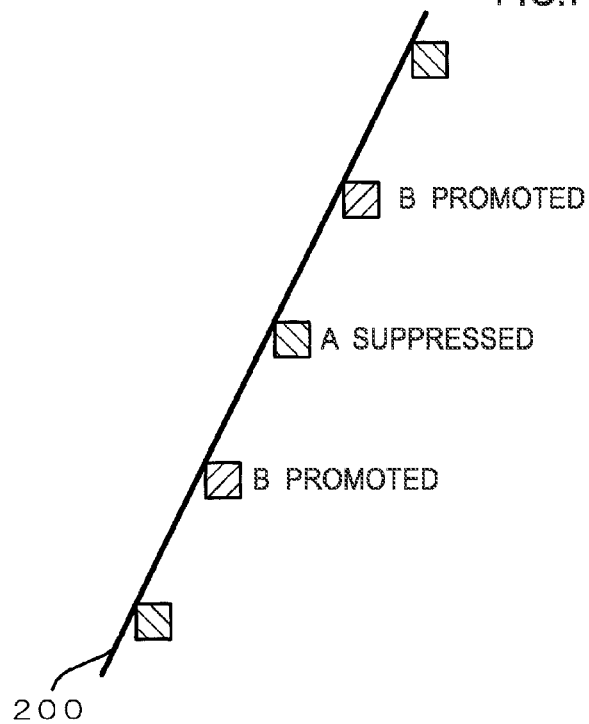

The second flow path 200 thereamong is shown in FIG. 7B. At this flow path, nozzle A is a suppressed nozzle, and nozzles B are promoted nozzles. By lining-up the suppressed nozzles and the promoted nozzles alternately in this way, the probability that adjacent nozzles will simultaneously jet ink drops can be reduced, and therefore, the occurrence of crosstalk can be suppressed. Note that the object of control such that suppressed nozzles and promoted nozzles are lined-up alternately may be all of the nozzles, or may be the nozzles to which ink is supplied from a specific flow path, or may be some of the nozzles so as to be, as another example, only the nozzles in the vicinity of the middle of the flow path.

Figure 8:
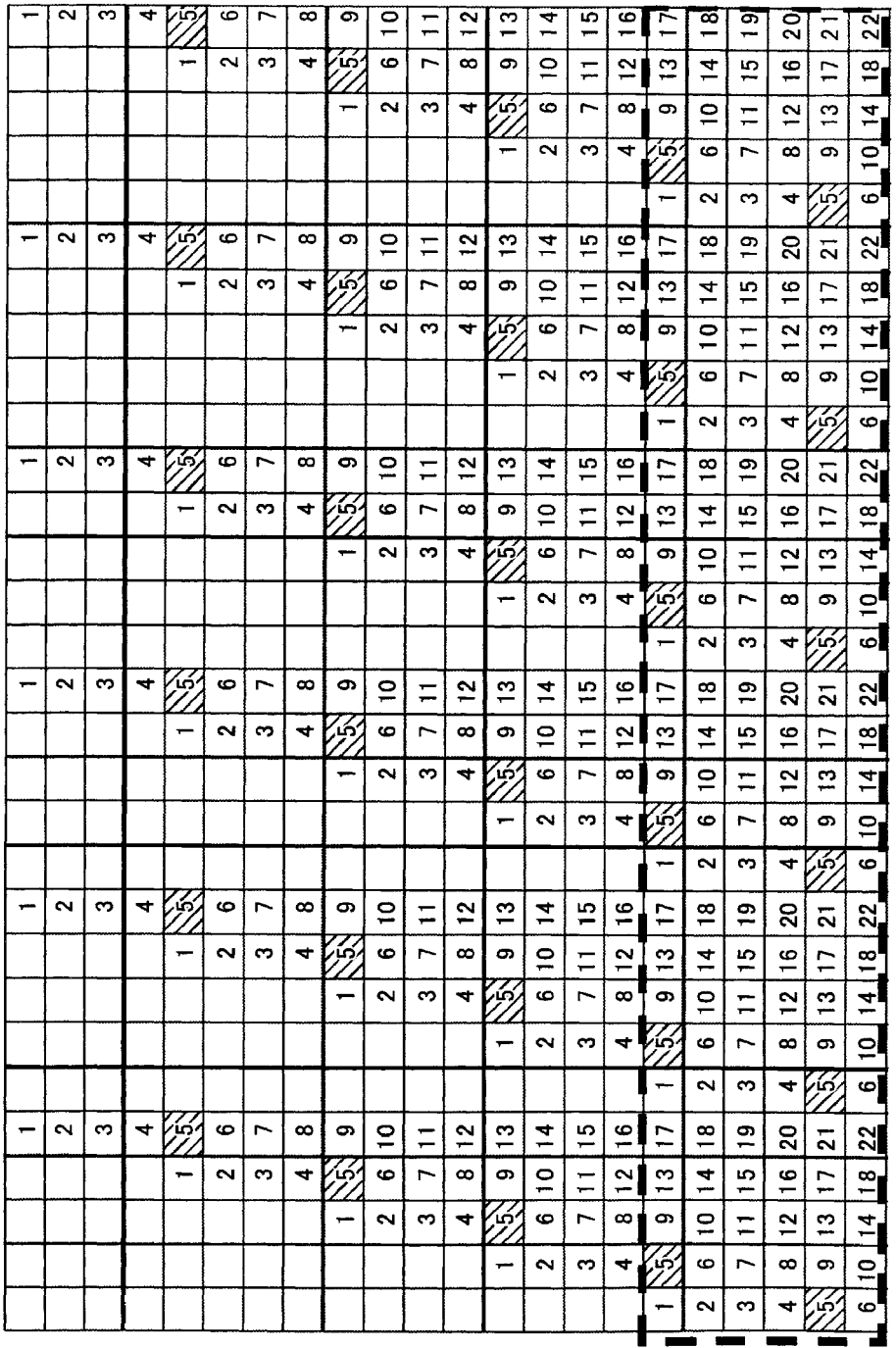
FIG. 8 is a drawing showing the correspondence between a sheet and nozzles.

The following description shows an example in which all of the nozzles are designated as suppressed nozzles or promoted nozzles in the case of the nozzle arrangement example shown in above-described FIG. 7A. In this case of this nozzle arrangement example, as shown in FIG. 8, ink drops are jetted from the respective nozzles. FIG. 8 is a drawing showing the correspondence between respective pixels on a sheet and the nozzles. The rectangles shown in FIG. 8 show the regions where the ink drops jetted from the nozzles land. The numbers within the rectangles represent the jetting timing. Namely, liquid drops are jetted at the same time at regions of the same numbers.

Figure 9:
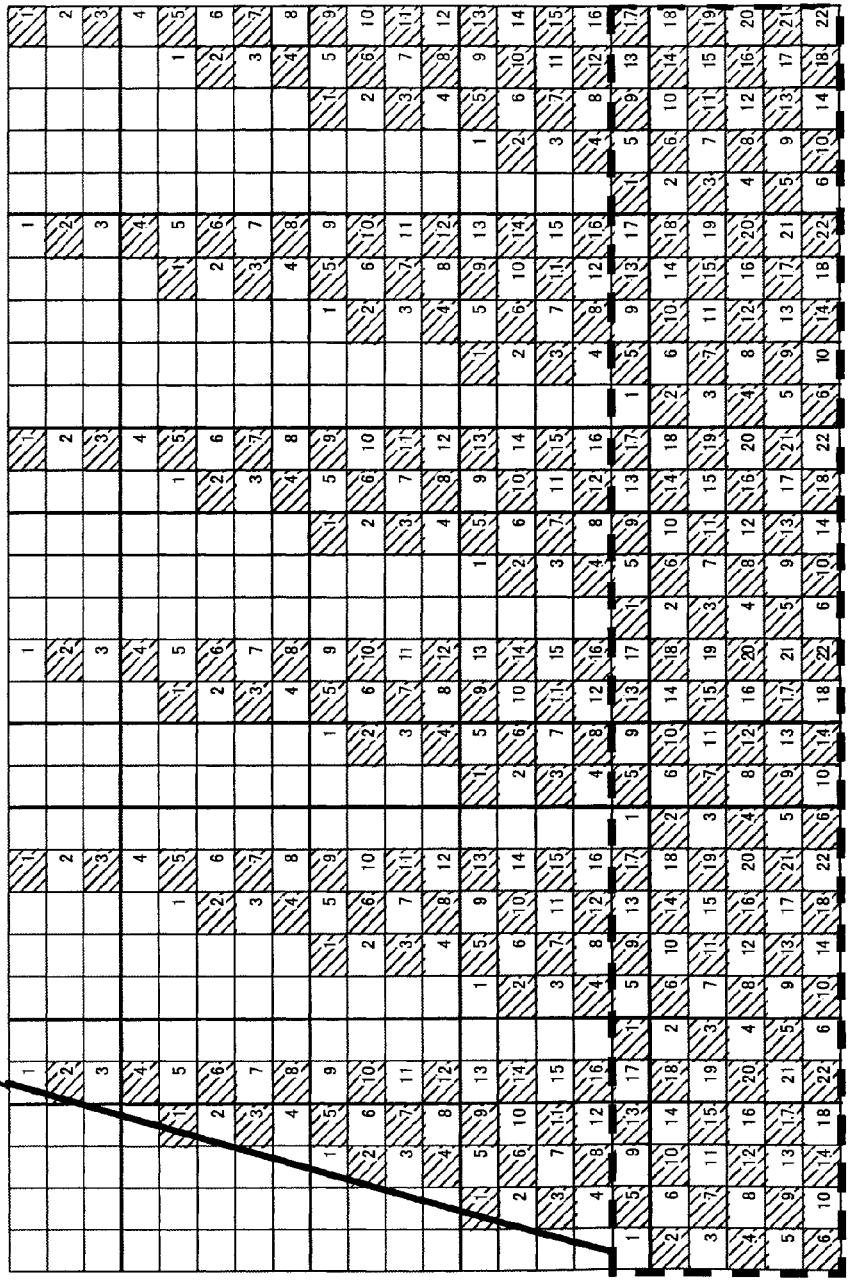
FIG. 9 is a drawing showing the correspondence between a sheet, and suppressing nozzles and promoting nozzles.

When there is the correspondence shown in FIG. 8 between the nozzles and the respective pixels on the sheet, the suppressed nozzles and the promoted nozzles may be made to correspond to the sheet as shown in FIG. 9. FIG. 9 is a drawing showing the correspondence between the respective pixels, and the suppressed nozzles and the promoted nozzles. As shown in FIG. 9, the regions are made to correspond to the suppressed nozzles and the promoted nozzles as shown by white and grey.

In FIG. 9, by switching the promoted nozzles and the suppressed nozzles at each jetting timing (sheet feeding direction), promoted pixels and suppressed pixels are disposed uniformly in the sheet feeding direction. Further, in the direction orthogonal to the sheet feeding direction as well, the promoted pixels and suppressed pixels are disposed uniformly. The promoted pixels and suppressed pixels being disposed uniformly in this way is desirable. Promoted pixels tend to have higher densities, and suppressed pixels tend to have lower densities. However, by arranging the promoted pixels and the suppressed pixels uniformly in this way, unevenness of density at the time of changing the recording rates of the respective nozzles can be reduced.

Further, in this arrangement, nozzles that are adjacent are set so as to be suppressed or promoted in the same timing. Therefore, the probability that nozzles that are adjacent on the same flow path will simultaneously jet can be reduced.

Note that, in the present example, the suppressed nozzles and the promoted nozzles are lined-up alternately. However, it suffices for the suppressed nozzles and the promoted nozzles to be near one another, and they do not have to be adjacent. For example, in a same flow path, the arrangement "standard/promoted/standard/suppressed/standard/promoted" may be used. In this case as well, simultaneous jetting of neighboring nozzles is suppressed. Further, although promoted and standard are arranged periodically in the present example, these as well do not have to be periodic.

Figure 10:
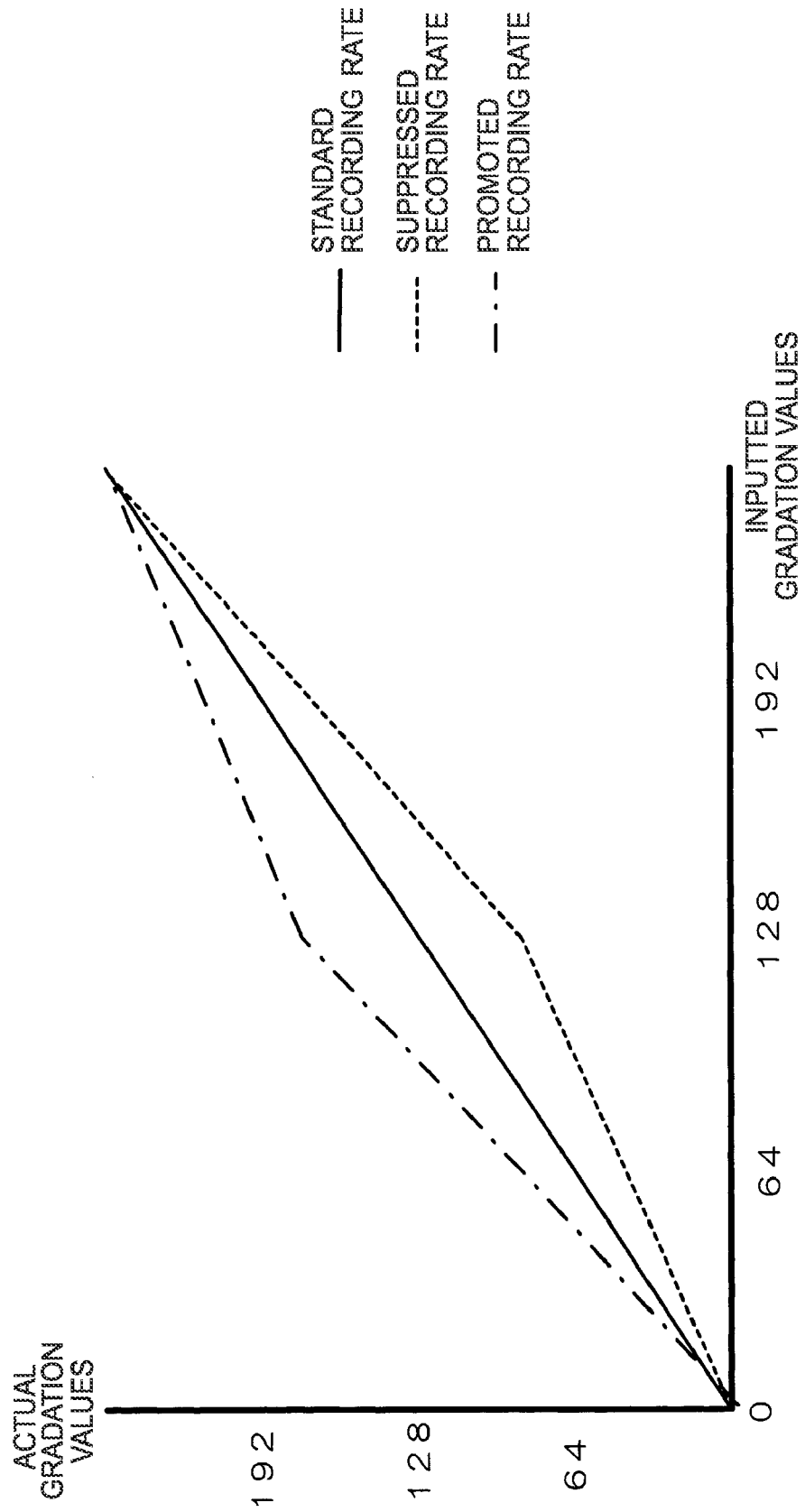
FIG. 10 is a drawing showing gamma characteristics.

Next, control of the head 64 by gamma correcting the image information by using a gamma characteristic that is such that there becomes the suppressed recording rate and a gamma characteristic that is such that there becomes the promoted recording rate, will be described. As described above, the image processing section 91 carries out halftone processing on the inputted image information. However, before that, the image processing section 91 carries out gamma correction by using the gamma characteristics shown in FIG. 10. In FIG. 10, inputted gradation values are shown on the horizontal axis, and actual gradation values that are used when actually printing are shown on the vertical axis. In this graph, a case in which the gradation values are 0 to 255 is shown as an example.

The solid line corresponds to the gamma characteristic at the standard recording rate, the dashed line corresponds to the gamma characteristic at the suppressed recording rate, and the dot-dash line corresponds to the gamma characteristic at the promoted recording rate. Namely, the image processing section 91 derives the actual gradation values by using the graph of the dot-dash line so that there becomes a suppressed recording rate that is suppressed as compared with the predetermined standard recording rate in accordance with the gradation values (image information) corresponding to the regions of the suppressed nozzles, and derives the actual gradation values by using the graph of the dashed line so that there becomes a suppressed recording rate that is suppressed as compared with the standard recording rate in accordance with the gradation values corresponding to the regions of the promoted nozzles.

In this way, the recording rate at some of the nozzles is promoted, and the recording rate at the other nozzles is suppressed. Further, in a macro view, because the gamma characteristic is the graph of the solid line corresponding to the standard recording rate, the density is maintained.

Note that unevenness is most visible as deterioration in image quality from intermediate gradations to near the shadow regions. In FIG. 10, the set actual gradation values are set such that the suppressed recording rate and the promoted recording great differ greatly at these gradations. It is desirable to set the actual gradation values in this way such that the difference between the gamma characteristic of the suppressed recording rate and the gamma characteristic of the promoted recording rate becomes a maximum at the gradation (intermediate gradation) where the unevenness is most conspicuous. At the shadow portions and at the highlight portions, the set actual gradation values are substantially the same, but because intermediate gradations are where unevenness is most visible as deterioration in image quality, it is difficult for problems to arise.

Control of the head 64 by subjecting the image information to halftone processing by using the error diffusion method by using, as the threshold values in the error diffusion method, threshold values that are such that there becomes the suppressed recording rate and threshold values that are such that there becomes the promoted recording rate, will be described next.

The image processing section carries out halftone processing on the image information by the error diffusion method by using the threshold values shown in FIG. 11. In FIG. 11, inputted gradation values are shown on the horizontal axis, and threshold values are shown on the vertical axis. In this graph, a case in which the gradation values are 0 to 255 is used as an example.

Further, the solid line corresponds to threshold values at the standard recording rate, the dot-dash line corresponds to threshold values at the suppressed recording rate, and the dashed line corresponds to threshold values at the promoted recording rate. With the error diffusion method, the smaller the threshold value, the less it is dispersed to other pixels, and therefore, the recording rate is promoted. The higher the threshold value, the more it is dispersed to other pixels, and therefore, the recording rate is suppressed.

Namely, the image processing section 91 carries out halftone processing by the error diffusion method by using the threshold values that are shown by the dashed line graph such that there becomes a suppressed recording rate that is suppressed as compared with the predetermined standard recording rate in accordance with gradation values (image information) corresponding to the regions of the suppressed nozzles, and by using the threshold values of the dot-dash line graph such that there becomes a suppressed recording rate that is suppressed as compared with the standard recording rate in accordance with gradation values corresponding to the regions of the promoted nozzles.

Although two types of threshold values are used in FIG. 11, the number of threshold values may be further increased. For example, two types of suppression parameters may be used, and reference values may be used for a portion thereof.

A first aspect of the present invention is an image forming device. The image forming device comprises: a conveying component that conveys a recording medium; a liquid drop jetting head having liquid chambers including jetting ports that jet liquid drops onto the recording medium conveyed by the conveying component, and a flow path that supplies or recovers liquid to or from the respective liquid chambers; and a control component controlling the liquid drop jetting head so that, among a plurality of and at least some of the jetting ports at a same flow path, jetting ports that jet liquid drops so that there becomes a suppressed recording rate that is suppressed as compared with a predetermined standard recording rate in accordance with image information expressing an image to be formed on the recording medium, and jetting ports that jet liquid drops so that there becomes a promoted recording rate that is promoted as compared with the standard recording rate, are neighboring.

In accordance with the first aspect, the liquid drop jetting head is controlled such that, among a plurality of and at least some of the jetting ports at a same flow path, jetting ports, that jet liquid drops such that there becomes the suppressed recording rate that is suppressed as compared with the predetermined standard recording rate in accordance with image information expressing an image to be formed on the recording medium, and jetting ports, that jet liquid drops such that there becomes the promoted recording rate that is promoted as compared with the standard recording rate, are neighboring. Due thereto, simultaneous jetting from neighboring jetting ports is suppressed, and therefore, the occurrence of crosstalk can be suppressed.

In the first aspect, the control component may control the liquid drop jetting head by carrying out gamma correction on the image information by using a gamma characteristic that is such that there becomes the suppressed recording rate, and a gamma characteristic that is such that there becomes the promoted recording rate.

In accordance with the above-described aspect, by gamma converting the image information by using a gamma characteristic that is lower than the usual recording rate for the jetting ports that suppress jetting and by using a gamma characteristic that is higher for the jetting ports that promote jetting, the recording rate of some of the jetting ports can be raised, and that of the others can be lowered, and simultaneous jetting from neighboring jetting ports can be suppressed. Therefore, the occurrence of crosstalk can be suppressed.

In the above-described aspect, the control component may control the liquid drop jetting head by halftone processing by subjecting the image information to an error diffusion method by using threshold values that are such that there becomes the suppressed recording rate and threshold values that are such that there becomes the promoted recording rate as threshold values in the error diffusion method.

In accordance with the above-described aspect, by using at least two types of threshold values for suppression and promotion for neighboring jetting ports when carrying out halftone processing of the image information by the error diffusion method, simultaneous jetting at these jetting ports can be suppressed, and therefore, the occurrence of crosstalk can be suppressed.

A second aspect of the present invention is a method of forming an image in an image forming device. The image forming device comprises: a conveying component that conveys a recording medium; and a liquid drop jetting head having liquid chambers including jetting ports that jet liquid drops onto the recording medium conveyed by the conveying component, and a flow path that supplies or recovers liquid to or from the respective liquid chambers. The image forming method comprises: controlling the liquid drop jetting head such that, among a plurality of and at least some of the jetting ports at a same flow path, jetting ports that jet liquid drops such that there becomes a suppressed recording rate that is suppressed as compared with a predetermined standard recording rate in accordance with image information expressing an image to be formed on the recording medium, and jetting ports that jet liquid drops such that there becomes a promoted recording rate that is promoted as compared with the standard recording rate, are neighboring.

The present invention has the effect of providing an image forming device that suppresses the occurrence of crosstalk.

What is claimed is:

1. An image forming device comprising:
a conveying component that conveys a recording medium;
a liquid drop jetting head having liquid chambers including jetting ports that jet liquid drops onto the recording medium conveyed by the conveying component, and a flow path that supplies or recovers liquid to or from the respective liquid chambers; and
a control component controlling the liquid drop jetting head so that, among a plurality of and at least some of the jetting ports at a same flow path, jetting ports that jet liquid drops are controlled so that there becomes a suppressed recording rate that is suppressed as compared with a predetermined standard recording rate in accordance with image information expressing an image to be formed on the recording medium, and other jetting ports that jet liquid drops are controlled so that there becomes a promoted recording rate that is promoted as compared with the standard recording rate,
wherein
the suppressed recording rate and the promoted recording rate are set so that the suppressed recording rate is smaller than the promoted recording rate,
the jetting ports that jet liquid drops so that there becomes a suppressed recording rate are controlled so that ink drops being jetted therefrom are reduced,
the jetting ports that jet liquid drops so that there becomes a promoted recording rate are controlled so that ink drops being jetted therefrom are increased, and
the jetting ports that jet liquid drops so that there becomes a suppressed recording rate neighbor the jetting ports that jet liquid drops so that there becomes a promoted recording rate.

2. The image forming device of claim 1, wherein the control component controls the liquid drop jetting head by carrying out gamma correction on the image information by using a first gamma characteristic that provides the suppressed recording rate, and a second gamma characteristic that provides the promoted recording rate.

3. The image forming device of claim 2, wherein the first gamma characteristic and the second gamma characteristic fluctuate in accordance with gradation values of the image information, and a difference between the first gamma characteristic and the second gamma characteristic becomes a minimum when a gradation value is a minimum and a maximum, and the difference becomes a maximum at a portion smaller than a center of the gradation values.

4. The image forming device of claim 1, wherein the control component controls the liquid drop jetting head by halftone processing the image by subjecting the image information to an error diffusion method by using threshold values that provide the suppressed recording rate and threshold values that provide the promoted recording rate as threshold values in the error diffusion method.

5. The image forming device of claim 4, wherein threshold values that provide the standard recording rate, the threshold values that provide the suppressed recording rate, and the threshold values that provide the promoted recording rate fluctuate in proportion to gradation values of the image information.

6. A method of forming an image in an image forming device,
wherein the image forming device comprises:
a conveying component that conveys a recording medium; and
a liquid drop jetting head having liquid chambers including jetting ports that jet liquid drops onto the recording medium conveyed by the conveying component, and a flow path that supplies or recovers liquid to or from the respective liquid chambers, and
the image forming method comprises:
controlling the liquid drop jetting head such that, among a plurality of and at least some of the jetting ports at a same flow path, jetting ports that jet liquid drops are controlled such that there becomes a suppressed recording rate that is suppressed as compared with a predetermined standard recording rate in accordance with image information expressing an image to be formed on the recording medium, and other jetting ports that jet liquid drops are controlled such that there becomes a promoted recording rate that is promoted as compared with the standard recording rate,
wherein
the suppressed recording rate and the promoted recording rate are set so that the suppressed recording rate is smaller than the promoted recording rate,
the jetting ports that jet liquid drops so that there becomes a suppressed recording rate are controlled so that ink drops being jetted therefrom are reduced,
the jetting ports that jet liquid drops so that there becomes a promoted recording rate are controlled so that ink drops being jetted therefrom are increased, and
the jetting ports that jet liquid drops so that there becomes a suppressed recording rate neighbor the jetting ports that jet liquid drops so that there becomes a promoted recording rate.

7. The image forming method of claim 6, wherein the liquid drop jetting head is controlled by gamma correction being carried out on the image information by using a gamma characteristic that provides the suppressed recording rate, and a gamma characteristic that provides the promoted recording rate.

8. The image forming method of claim 7, wherein the gamma characteristic that provides the suppressed recording rate and the gamma characteristic that provides the promoted recording rate fluctuate in accordance with gradation values of the image information, and a difference between the gamma characteristic that provides the suppressed recording rate and the gamma characteristic that provides the promoted recording rate becomes a minimum when a gradation value is a minimum and a maximum, and the difference becomes a maximum at a portion smaller than a center of the gradation values.

9. The image forming method of claim 6, wherein the liquid drop jetting head is controlled by the image being halftone processed by the image information being subjected to an error diffusion method by using threshold values that provide the suppressed recording rate and threshold values that provide the promoted recording rate as threshold values in the error diffusion method.

10. The image forming method of claim 9, wherein threshold values that provide the standard recording rate, the threshold values that provide the suppressed recording rate, and the threshold values that provide the promoted recording rate fluctuate in proportion to gradation values of the image information.

* * * * *